United States Patent [19]

Boccardo

[11] Patent Number: 5,188,666

[45] Date of Patent: Feb. 23, 1993

[54] PAINT REMOVING COMPOSITIONS AND METHODS FOR THE MANUFACTURE AND USE THEREOF

[76] Inventor: Victor N. Boccardo, 200 Colwick Rd., Cherry Hill, N.J. 08002

[21] Appl. No.: 425,342

[22] Filed: Oct. 17, 1989

Related U.S. Application Data

[63] Continuation of Ser. No. 142,312, Dec. 29, 1987, abandoned, which is a continuation of Ser. No. 509,859, Jun. 30, 1983, abandoned.

[51] Int. Cl.$^5$ .................................................. C08L 1/08
[52] U.S. Cl. ........................................ 106/190; 134/7; 134/38; 252/171
[58] Field of Search .............. 252/171, 165, 166, 167, 252/168, 169–170; 134/4, 6, 7, 26, 38; 106/190

[56] References Cited

U.S. PATENT DOCUMENTS

| | | | |
|---|---|---|---|
| 3,189,553 | 6/1965 | Lange | 252/165 |
| 3,712,886 | 1/1973 | Koyanagi et al. | 106/197.1 |
| 3,920,472 | 11/1975 | Vinson | 134/38 |
| 3,950,185 | 4/1976 | Toyama et al. | 134/38 |
| 4,370,174 | 1/1983 | Braithwaite | 134/7 |
| 4,465,617 | 2/1987 | Vivian | 134/38 |
| 4,643,840 | 2/1987 | Brocklehurst | 252/160 |
| 4,741,784 | 5/1988 | Roeser | 252/170 |
| 4,801,397 | 1/1989 | Flanagan et al. | 252/154 |

FOREIGN PATENT DOCUMENTS

| | | | |
|---|---|---|---|
| 0606626 | 10/1960 | Canada | 536/91 |
| 00373 | 1/1985 | PCT Int'l Appl. | 134/38 |

*Primary Examiner*—Mark L. Bell
*Assistant Examiner*—Paul Marcantoni
*Attorney, Agent, or Firm*—John P. Blasko

[57] ABSTRACT

Novel paint removing compositions, a method for their production, and methods for using the same, are described, which employ conventional active paint removing ingredients, in combination with auxiliary ingredients, which aid in lifting paint from a painted surface, such as an automobile body and which act to prevent re-adhesion of the paint, and to convert the paint-paint-removing composition mixture to a dry, friable mass, which is easily removed to exposed the bare substrate, and produce a dry, easily handled and disposable waste product.

10 Claims, No Drawings

PAINT REMOVING COMPOSITIONS AND METHODS FOR THE MANUFACTURE AND USE THEREOF

This is a continuation of co-pending application Ser. No. 07/142,312 filed on Dec. 29, 1987 now abandoned, which is a continuation of application Ser. No. 06/509,859 filed on Jun. 30, 1983, now abandoned.

BACKGROUND AND PRIOR ART

The present invention relates to paint removal and, more particularly, to the stripping of paint and other finishes from automobiles prior to re-painting.

It is well-known to those in the automobile body repair and refinishing art that removal of the old automotive finish is the most difficult, time-consuming, and messiest part of the work. Automotive finishes can be removed by sanding and/or with the aid of chemical strippers. When using a chemical stripper, typically a liquid, or more usually, a semi-liquid thin paste, containing the active paint stripper is applied to the auto body to be stripped and allowed to stand until the paint has been lifted from the surface. This may require several hours or even standing overnight. When the paint is at its loosest, it is removed by scraping. This produces a messy deposit on the floor of the work place consisting of strips or scraps of paint film swollen with the still wet paint remover. Inasmuch as the active paint removing agents in the paint remover are irritating to the skin and eyes, protective gloves and goggles are preferably worn for this work. In any event, it is a difficult and unpleasant task to clean up and dispose of the wet paint strippings.

Another disadvantage of commercially available paint removers, particularly for automotive use, is that they have varying degrees of effectiveness, removing most of the paint in some cases, but only part of the paint or hardly any of it in others. Previously available paint removers are particularly ineffective on epoxy, urethane and lacquer finishes, and some automotive undercoats.

Still another disadvantage of currently available chemical paint strippers is that the paint tends to re-adhere to the stripped surface if the paint remover is allowed to stand too long. Therefore, the scraping operation must be conducted at the optimum time to avoid the need to re-apply paint remover with consequent loss of time. This presents a scheduling problem and necessarily reduces efficiency.

The deficiencies of presently available chemical paint removers are so great that some auto body shops resort to the more time-consuming and therefore, expensive sand-blasting and grinding techniques. These methods of paint removal also have the disadvantage of creating a dust problem, requiring the workers to wear protective masks and clothing. Also, as with any operation that creates a dust-laden atmosphere, there is always the possibility of a dust explosion.

In view of the very large volume of automotive refinishing work, and the obvious disadvantages of the current methods of paint removal, it is apparent that there is a pressing need in the art for an improved method of paint removal and improved chemical compositions for this purpose.

It is a primary object of the present invention, therefore, to provide an improved method for removing paint, and particularly automotive paint, and improved chemical compositions for this purpose, which are not subject to the disadvantages of the prior art.

It is another object of the invention to provide an improved method and compositions for paint removal, which reduce labor, increase efficiency, do not require protective clothing during the stripping operation, and which permit easy clean up of the stripped paint.

It is still another object of the invention to provide a method and compositions for paint removal, which prevent re-adhesion of stripped paint to the treated surface.

It is yet another object of the invention to provide a method and compositions for paint removal; which are not only more efficient and convenient than those of the prior art, but which are also less expensive.

It is still another object of the invention to provide a method and compositions capable of completely removing all commercial automotive finishes, including acrylics, synthetics, epoxies, urethanes, lacquers and undercoatings, down to the bare metal with minimal effort in the stripping operation.

It is another object of the invention to provide a method and compositions for automotive paint removal in which the paint is removed in dry flake form without the need for heavy manual scraping.

It is another object of the invention to provide a method and compositions for the removal of automotive paint in which the stripped paint is converted to a dry, frangible mass, which can be removed from the treated surface by compressed air from an air gun to form a dry flaky material easily swept up for disposal.

It is yet another object of the invention to provide paint removing compositions which have good flow and adhesion, long shelf life, non-flammability, good color and low odor.

It is still another object of the invention to provide such compositions which are capable of removing multiple coats of paint in a single operation.

SUMMARY OF THE INVENTION

The foregoing and other objects of the invention which will become apparent below are achieved by the incorporation of one or more ingredients in a paint stripping composition which aid the primary active paint removing agent, such as methylene chloride, to achieve complete paint removal and to convert the stripped paint and paint remover to a dry, friable mass, which is not only easily removed from the treated surface to leave bare metal, but which is also safely handled without gloves or other protective clothing.

The primary novelty in the present invention resides in the discovery that the addition of from about 3 to about 10% by weight of certain dry, particulate, absorbent materials, such as expanded peslite or diatomaceous earth, to the paint remover causes the formation, from the stripped paint and paint remover residue, of a dry, friable, easily removed mass, which can be handled without gloves or other protective clothing without irritation of the skin of the operator.

Additional novelty in the new compositions resides in the incorporation of certain thickening agents which operate in combination with the expanded perlite or diatomaceous earth or equivalent to produce the desired friable dry mass of paint and paint remover. Various thickening agents known to the art per se and previously employed in the paint removers not containing a material providing a dry mass may be used. These include, among others, modified cellulose compositions such as Methocel, which may suitably have a viscosity of from about 2000 to about 6000 cps., preferably about 4000.

While not essential for all automotive finishes, it has been found that it is necessary to include from about 1% to about 4% ammonia in the new compositions in order to successfully remove lacquer type automotive finishes. The ammonia may be added in any suitable form, but concentrated aqua ammonia is preferred for ease of handling. Again, while ethanol is not an essential ingredient for some automotive finishes, it is necessary to add about 3 to about 6% to successfully remove epoxy and urethane automotive finishes. Other optional, but desirable, ingredients are as follows: refined paraffin wax; mineral spirits or the equivalent and methanol.

DESCRIPTION OF THE PREFERRED EMBODIMENTS

More specifically, the new paint removers have the following compositions.

| The Compositions | Percent By Weight | | |
| --- | --- | --- | --- |
| Ingredient | Min. | Preferred | Max. |
| Methylene chloride | 70 | 78 | 82 |
| Paraffin refined wax | 1.5 | 2 | 4 |
| Mineral Spirits | 1 | 2 | 5 |
| Ethyl alcohol, denatured | 0 | 3 | 6 |
| Aqua ammonia | 0 | 4 | 8 |
| Hydroxypropylmethyl cellulose | 1 | 2 | 4 |
| Methanol | 1 | 4 | 8 |
| Expanded perlite or diatomaceous earth | 3 | 5 | 10 |

It should be understood that the foregoing proportions are approximate and that they are based on the weight of the total composition.

The preferred active paint stripping agent, methylene chloride, is commonly used for this purpose in chemical paint removers. While, less than about 70% methylene chloride may be used, if desired, there is a consequent loss of paint stripping effectiveness. It is preferred to use about 75 to about 78% to provide a composition which will have the desired effectiveness. While more than 82% methylene chloride could be used, it has not been found necessary to do so, and such large amounts increase the rate of evaporation from the composition, and consequently its odor.

The ethyl alcohol is not an essential ingredient, but is desirable, since it aids in the penetration of various paint surfaces, and particularly automotive lacquer finishes.

The aqua ammonia or its equivalent is an essential ingredient, particularly for lacquer removal, since it creates a bubbling effect in use which helps to lift the paint from the treated surface. While anhydrous ammonia could be used, it is more convenient to handle aqua ammonia. Any suitable concentration of aqua ammonia may be used up to about 36° Baume', which is an aqueous solution containing about 30% ammonia, by weight. Other sources of ammonia may also be employed, such as organic amines. While somewhat more than about 8% aqua ammonia may be employed, it has not been found to be necessary and it is undesirable to add more water to the composition than is contained in that amount of aqua ammonia.

A thickening agent is added to lend body to the composition, to add in holding it in place on the surface to be treated. Any suitable thickening agent known to the art may be employed. Modified cellulose available under the tradenames "Methocel" and "Cellosize" are suitable. Carboxymethylcellulose, methylcellulose and hydroxyethyl cellulose are also very effective. The preferred thickening agent is hydroxypropylmethyl cellulose, suitably having a viscosity of about 4000 to about 5000 cps. While less than 1% thickening agent may be employed the resulting compositions are thin and difficult to use. More than 4% of the thickening agent may be used but is seldom necessary. Other thickening agents are operable at viscosities of from about 2000 to about 6000 cps.; 4000 cps. being preferred.

The methanol is also an optional, but desirable ingredient, since it swells the modified cellulose thickening agent and enhances its thickening properties. Less than about 1% methanol may be used, but with reduced effect. More than about 4% methanol may also be used, but is seldom necessary, and would require labeling the composition as a poison.

Any suitable refined paraffin wax may be employed in amounts from about 1.5 to about 4% by weight. The wax serves several functions, i.e., it reduces evaporation of the volatile ingredients and for this reason also reduces the odor of the ammonia. The wax also forms a film after application of the paint stripping composition to a surface to be treated. The wax film aids in holding the other ingredients in place while the composition is working. While less than about 1.5% wax may be employed, such small amounts reduce control of evaporation. More than about 4% wax is undersirable, since it reduces the bubbling effect of the ammonia.

The mineral spirits are employed to dissolve the solid paraffin wax for addition to the liquid or semi-liquid composition. The preferred mineral spirits are a hydrocarbon cut having a boiling point in the range from about 200° F. to about 400° F. Other wax solvents such as xylene or toluene, for example, may also be employed. From about 1% to about 5% wax solvent may be employed depending on the amount of wax used. The solid wax is placed in the solvent in a container and the solvent is heated sufficiently to dissolve the wax; typically to about 130° F.

The most important ingredient and the one which is primarily responsible for the advantages of the new paint stripping compositions is a dry, inert, particulate absorbent material. The preferred material for this purpose is expanded perlite, but diatomaceous earth expanded is also suitable. These materials absorb the paint remover and stripped paint, prevent the stripped paint from re-adhering to the treated surface and dry the mixture to form an easily removable, dry, frangible mass. Certain materials other than expanded perlite, for example diatomaceous earth also serve this purpose, expanded perlite, for example. However, a number of commonly available absorbent particulate materials which might suggest themselves for this purpose are, in fact, inoperable. Such inoperable materials include saw dust, or wood flour, talc, bentonite, potato starch, and clay among many others. However, having disclosed the utility of diatomaceous earth and expanded perlite for this purpose, those skilled in the art will be able to find other operable materials by routine trial and error, and, therefore, it is the concept which constitutes the invention and not the use of expanded perlite or diatomaceous earth, per se. The expanded perlite, diatomaceous earth, or other operable absorbent is added to the paint remover in amounts of about 3 to about 5% by weight. Less than 3% may be employed, but with reduction in the desired properities of preventing re-adhesion of the paint and drying of the mixture to an easily removed frangible mass. More than 5% by weight of the absorbent may be used, but to do so is unnecessary to achieving the desired properties and, of course, reduces the proportion of active ingredients.

As noted above, some of the ingredients are optional. However, three of the ingredients have been found essential to achieving the complete removal of an automotive finish as a dry frangible or friable mass easily separated from the treated surface. These essential ingredients expanded perlite or, diatomaceous earth, thickener and ammonia, or their equivalents, work in combination to produce the novel properties of the new compositions.

The invention also includes the method of making the new compositions, since it has been found that the order of addition of at least some of the ingredients is critical to achieving compositions having the desired properties.

The preferred method of making new new compositions is as follows. The methylene chloride is stirred in a suitable container with conventional blending equipment. In a separate container, the wax is dissolved in the mineral spirits or other wax solvent by heating and melting the wax in the solvent. The solution of wax and solvent is then added to the methylene chloride, slowly with continued stirring. Next, while the stirring continues, the expanded perlite or hydroxypropylmethyl cellulose is slowly added followed by the expanded perlite or diatomaceous earth, or equivalent. The aqua ammonia is added next, followed by the ethyl alcohol. The methanol is then added as the last ingredient.

In this way a paint stripping composition is made which has long shelf life, is non-flammable, has good color and a low odor, and which is capable of completely removing any automotive finish down to the bare metal.

The new compositions may be applied to the surface to be treated by techniques known in the art, such as by brushing or rolling, or even spraying, if desired. The new compositions lift the paint from the metal and dry in about 4 to about 6 hours, in most cases. If desired the compositions may be removed by scraping or wiping while still wet after the paint has been lifted. This is not preferred however, since the primary advantages of dry stripping and clean up are lost. It is preferred to wait until the paint and paint remover mixture has fully dried to a friable, dry mass. This mass is then very easily removed by any suitable mechanical method with minimal effort, as by scraping or brushing, either manually or by the use of a power tool. The easiest method of all is to use compressed air from commercially available hand held air guns, which direct a jet of air at the friable mass to swiftly and fully remove it from the bare metal. The flaked or powdered mass containing the removed paint is then simply swept up and discarded as clean dry, easily handled loose material.

The preferred practice is to apply the compositions to the surfaces to be treated at the end of the work day and to let the composition work and dry overnight for removal in the morning. This leaves the remainder of the work day for refinishing the auto body. The new compositions are very economical, since they are made from inexpensive ingredients, and usually only one gallon is needed to strip most automobiles.

The invention will now be described in greater detail in the following examples.

EXAMPLE I

Production of a Paint Stripping Composition

Place 2 lbs of solid, refined paraffin wax into a metal pot containing 2 lbs of mineral spirits. the wax should be cut or chopped into small pieces to facilitate melting and solution. Heat the pot with occasional mild stirring, until the mineral spirits reach the melting point of the wax, i.e., about 130° F., and continue stirring until all of the wax has melted and dissolved.

Add the mineral spirits - wax solution very slowly to 78 lbs of methylene chloride in a vessel fitted with a conventional stirrer. Stir the mixture slowly, during the gradual addition of the wax solution, until all of the wax has been added and the solution in the vessel is homogeneous. While continuing mild stirring, add 2 lbs of hydroxypropylmethyl cellulose followed by 5 lbs of diatomaceous earth ("Celatom Diatomite"or expanded perlite ) to form a suspension of the particles of diatomaceous earth in the liquid vehicle. Then, while continuing mild stirring, add 4 lbs of 36° Baume' aqua ammonia followed by 3 lbs of denatured ethyl alcohol. Lastly, add 4 lbs of methanol and continue stirring until the mixture is homogeneous. Continue stirring while filling the finished paint stripper into drums or gallon cans in order to insure the uniformity of the composition.

EXAMPLE II

Use of the Paint Stripping Composition

The paint stripping composition of Example I is preferably poured onto the surface of an automobile to be stripped and brushed in one direction using an ordinary paint brush. Use about one gallon of the composition to coat a full-sized automobile. Allow the paint stripper to stand in contact with the auto body for from 4 to 6 hours or preferably overnight, until the lifted paint and paint stripper is thoroughly dry to the touch.

Then remove the dry, friable paint-paint stripper mass from the auto body by any suitable mechanical means, such as a scraper, a common scrub brush or, preferably and most easily, by the use of a commercially available compressed air gun. Then sweep up the flaky and powdered residue and dispose of it as clean rubbish or fill.

No protective clothing or breathing device is required either during the application of the paint stripper or during its removal as a dry safely handled material.

It will be apparent to those skilled in the art that the foregoing description and examples are merely illustrative, and that other compositions, and other methods of making and using them are included in the scope of the invention. For example, and without limitation, any known active paint stripping ingredient other than the preferred methylene chloride may be used. The ammonia may be supplied from any known source, other than the preferred, hydroxypropylmethyl cellulose. Most importantly, while diatomaceous earth is presently the preferred inert, expanded perlite is also preferred, particulate absorbent material, each of which provides the major advantages of the new compositions, the invention resides in the concept of using such a material in a paint stripper and any functional equivalent of the diatomaceous earth or expanded perlite may be employed. Indeed, functional equivalents of any of the ingredients may be used, and any other ingredients commonly employed in such compositions may also be added so long as they do not alter the character of the claimed compositions.

What is claimed is:

1. A method for removing paint from a painted surface as a dry, substantially solvent free frangible mass which comprises the steps of:
   a. applying to a painted surface an improved paint remover composition comprising, in percent by weight of the total,;
      (i) from about 70 to about 82 percent methylene chloride;
      (ii) from about 1.5 to about 4 percent paraffin refined wax;
      (iii) from about 1 to about 5 percent mineral spirits
      (iv) from about 0 to about 6 percent denatured ethyl alcohol;
      (v) from about 0 to about 8 percent aqua ammonia;
      (vi) from about 1 to about 4 percent hydroxypropyl methyl cellulose;
      (vii) from about 1 to about 8 percent methanol;
      (viii) from about 3 to about 10 percent frangible mass forming inert absorbent particulate;
   b. allowing said composition to lift the paint from the painted surface and form a dry, substantially solvent free, frangible mass of removed paint and particulate; and
   c. removing said frangible mass by physical means.

2. The method of claim 1 wherein said frangible mass forming inert absorbent is selected from the group consisting of diatomaceous earth and expanded perlite.

3. A method for removing paint from a painted surface as a dry, substantially solvent free frangible mass which comprises the steps of:
   a. applying to a painted surface an improved paint remover composition comprising in weight percent of the total weight;
      (i) about 78% methylene chloride;
      (ii) about 2% paraffin refined wax;
      (iii) about 2% mineral spirits;
      (iv) about 3% ethyl alcohol;
      (v) about 4% aqua ammonia 36° Baume;
      (vi) about 2% hydroxypropylmethyl cellulose;
      (vii) about 4% methanol; and
      (viii) about 5% frangible mass forming inert absorbent particulate;
   b. allowing said composition to lift the paint from the painted surface and form a dry, substantially solvent free, frangible mass of removed paint and particulate; and
   c. removing said frangible mass by physical means.

4. The method of claim 3 wherein said frangible mass forming inert absorbent particulate is selected from the group consisting of diatomaceous earth and expanded perlite.

5. An improved paint removing composition comprising, in weight percent of the total weight, from about 70 to about 82% methylene chloride; from about 1.5 to about 4% paraffin refined wax; from about 1 to about 5% mineral spirits; from about 0 to about 6% denatured ethyl alcohol; from about 0 to about 8% aqua ammonia; from about 1 to about 4% hydroxypropylmethyl cellulose; from about 1 to about 8% methanol; and from about 3 to about 10% frangible mass forming inert absorbent particulate.

6. The paint removing composition of claim 5 wherein said frangible mass forming inert absorbent particulate is selected from the group consisting of diatomaceous earth and expanded perlite.

7. An improved paint removing composition comprising, in weight percent of the total weight, about 78% methylene chloride; about 2% paraffin refined wax; about 2% mineral spirits; about 3% ethyl alcohol; about 4% aqua ammonia 36° Baume; about 2% hydroxypropylmethyl cellulose; about 4% methanol; and about 5% frangible mass forming inert absorbent particulate.

8. The improved paint removing composition of claim 7 wherein said frangible mass forming inert absorbant particulate is selected from the group consisting of diatomaceous earth and expanded perlite.

9. A method for removing paint from a painted surface comprising the steps of:
   applying to a painted surface a paint remover composition comprising at least one active paint removing organic solvent and other auxiliary components formulated such that after lifting paint from the surface by the paint remover composition a dry frangible mass comprising removed paint is formed on the surface which is readily removable from the surface as a dry powder or flake material;
   allowing the paint remover composition to lift paint from the surface and to form a dry frangible mass comprising removed paint; and
   removing the dry frangible mass from the surface in the form of a dry powder or flake material;
   wherein the paint remover composition comprises, in weight percent of total weight, from about 70 to about 82 percent methylene chloride, from about 1.5 to about 4 percent paraffin refined wax, from about 1 to about 5 percent mineral spirits, from about 0 to about 6 percent denatured ethyl alcohol, from about 0 to about 8 percent aqua ammonia, from about 1 to about 4 percent hydroxypropylmethyl cellulose, form about 1 to about 8 percent methanol, and from about 3 to about 10 frangible mass forming inert absorbent particulate.

10. A method according to claim 9, wherein the frangible mass forming inert absorbant particulate is selected from the group consisting of diatomaceous earth and expanded perlite.

* * * * *